United States Patent [19]

Hattori

[11] Patent Number: 4,560,371
[45] Date of Patent: * Dec. 24, 1985

[54] V-BELT TRANSMISSION APPARATUS
[75] Inventor: Torao Hattori, Wako, Japan
[73] Assignee: Honda Giken Kogyo Kabushiki Kaisha, Tokyo, Japan
[*] Notice: The portion of the term of this patent subsequent to Apr. 23, 2002 has been disclaimed.
[21] Appl. No.: 603,061
[22] Filed: Apr. 23, 1984
[30] Foreign Application Priority Data
  Apr. 23, 1983 [JP] Japan ................. 58-70920
[51] Int. Cl.$^4$ ............................................. F16G 5/16
[52] U.S. Cl. ................................... 474/201; 474/242
[58] Field of Search ............... 474/201, 202, 242, 244, 474/237, 265

[56] References Cited
U.S. PATENT DOCUMENTS
  4,371,361  2/1983  Giacosa ............................. 474/201
  4,457,742  7/1984  Hattori et al. ..................... 474/201
  4,512,753  4/1985  Hattori ........................... 474/201 X FOREIGN PATENT DOCUMENTS
  1228884  11/1966  Fed. Rep. of Germany .
  33-7762   9/1958  Japan .
  0054838   3/1984  Japan ................................. 474/201
  0050252   3/1984  Japan ................................. 474/201

Primary Examiner—Stephen J. Novosad
Assistant Examiner—Thuy M. Bui
Attorney, Agent, or Firm—Armstrong, Nikaido, Marmelstein & Kubovcik

[57] ABSTRACT

A V-belt transmission is provided which comprises V-groove pulleys and an endless belt surrounding the pulleys. A plurality of V-shaped belt engaging metallic members are positioned along the endless belt in the longitudinal direction thereof, each having a belt engaging surface for engaging the belt. A plurality of intermediate members are positioned between adjacent engaging members, with the intermediate members being positioned on the inside of the endless belt. Each of the engaging members includes a receiving surface for contacting the adjacent intermediate member, with at least one of the receiving surfaces being shaped to apply a force to the intermediate member in the longitudinal direction of the belt when the engaging member is brought into contact with the V-groove of the V-groove pulleys. The belt engaging surface of the engaging member is aligned with the mid-point of the height of the inclined side surfaces thereof which contact the V-groove of the V-groove pulleys. Further, the transmission includes resilient stopper members which hold the endless belt in a groove in the engaging member. The resilient stopper members have a size such that they contact adjacent stopper members in the longitudinal direction of the belt.

8 Claims, 12 Drawing Figures

V-BELT TRANSMISSION APPARATUS

BACKGROUND OF THE INVENTION

This invention relates to a V-belt type transmission apparatus used for a variable-speed type transmission for a vehicle or the like, and is more particularly directed to a V-belt transmission apparatus having an endless metallic belt with a large number of V-shaped metallic engaging members. Each V-shaped metallic member has an outwardly directed engaging surface which contacts the metallic belt, such that the metallic members are disposed in a line in the lengthwise direction of the metallic belt to form a V-belt assembly. The V-belt assembly is applied between a pair of V-pulleys on a driving side and a driven side for effecting a power transmission therebetween.

In V-belt transmissions previously proposed by the applicant herein, a large number of intermediate members such as hollow rollers or the like are interposed between adjacent members inside the metallic belt and each of the metallic members is held so as to be slidably moved outwards and inwards so that if the metallic members are pushed into the V-groove of the V-pulley, then outwardly directed reaction forces are generated in response to the pushing-in operation. The intermediate members are thereby brought into pressure contact, at their outwardly directed engaging surfaces, with the metallic belt, resulting in their firm engagement therewith, and thereby the metallic belt is applied with the tension force generated by the V-pulley for effecting power transmission. This type of apparatus, however, has the disadvantage that there is a large stress generated in the metallic belt where it engages each of the metallic members. This stress results from the foregoing reaction force. It is desirable for improving durability thereof, that the reaction forces be distributively applied to the metallic belt not only through the respective metallic members but also through the respective intermediate members.

SUMMARY OF THE INVENTION

It is the primary object of the present invention to provide an V-belt trasmission having an endless belt, a plurality of metallic engaging members, and a plurality of intermediate members between adjacent engaging members, wherein the engaging members have a shape which produces a wedge effect for applying a pressing force in the lengthwise direction of the endless belt to the adjacent intermediate members when the engaging members are pushed outwards by the groove of a V-pulley.

It is another object of the present invention to provide a V-belt transmission in which the travel speed of the inner surface of the endless belt and the belt engaging surfaces of the engaging members is the same, thereby preventing slippage which reduces the life of the endless belt.

It is still a further object of the present invention to provide a V-belt transmission which includes resiliant stopper members for holding the endless belt within a groove in the engaging members and wherein each stopper member engages an adjacent stopper member such that proper positioning of the stopper members is automatically attained and the stopper members are maintained in the proper position.

The present invention is directed to a V-belt transmission which comprises V-groove pulleys and an endless belt surrounding the pulleys. A plurality of V-shaped, belt engaging metallic members are positioned along the endless belt in the longitudinal direction thereof, each having a belt engaging surface for engaging the belt. A plurality of intermediate members are positioned between adjacent engaging members, with the intermediate members being positioned on the inside of the endless belt. Each of the engaging members includes a receiving surface for contacting the adjacent intermediate member, with at least one of the receiving surfaces being shaped to apply a force to the intermediate member in the longitudinal direction of the belt when the engaging member is brought into contact with the V-groove of the V-groove pulleys. The belt engaging surface of the engaging member is aligned with the mid-point of the height of the inclined side surfaces thereof which contact the V-groove of the V-groove pulleys. Futher, the transmission includes resiliant stopper members which hold the endless belt in a groove in the engaging member. The resiliant stopper members have a size such that they contact adjacent stopper members in the longitudinal direction of the belt.

DETAILED DESCRIPTIONS OF THE PREFERRED EMBODIMENTS

Figure 1:
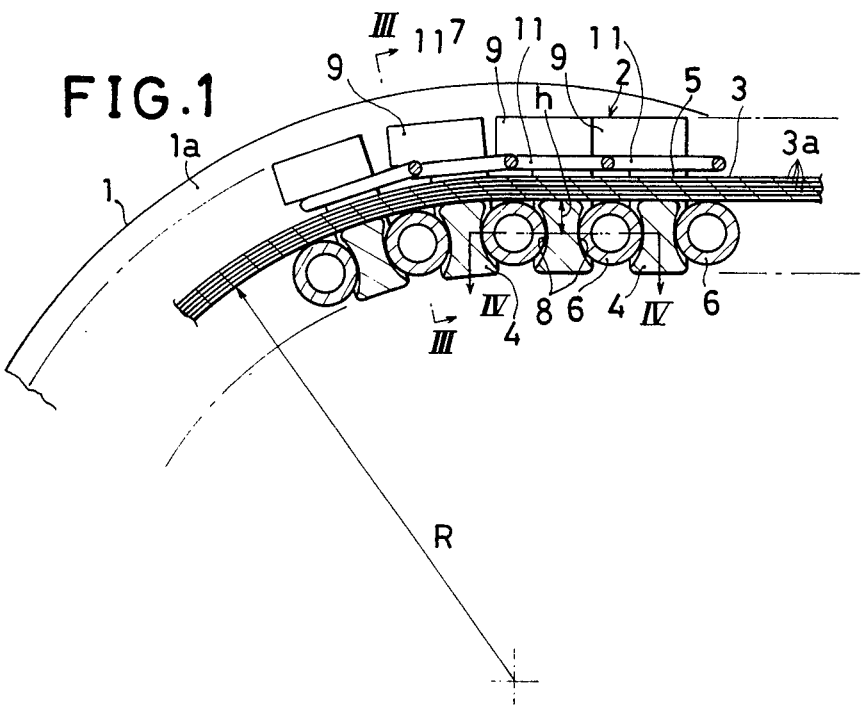
FIG. 1 is a sectional side view of one embodiment of the present invention.
Figure 2:
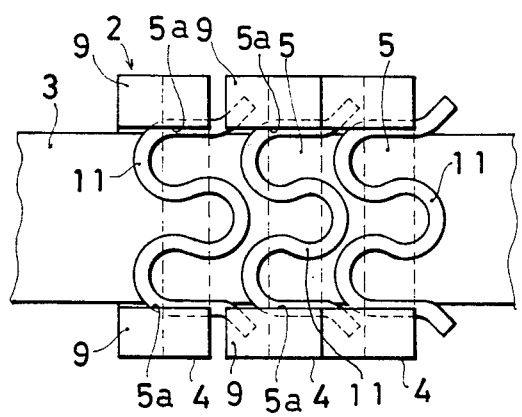
FIG. 2 is a top plan view thereof.
Figure 3:
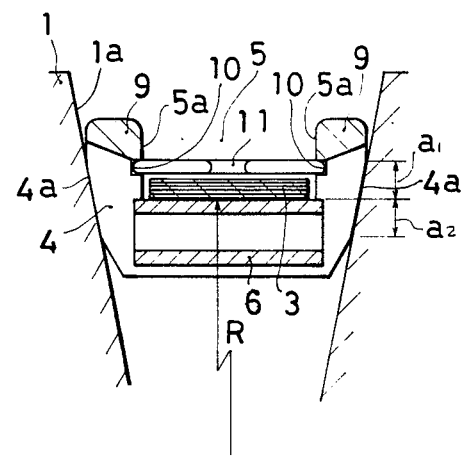
FIGS. 3 and 4 are sectional views taken along the line III—III and IV—IV in FIG. 1.

Referring to FIGS. 1 to 3, a variable type V-pulley 1 is on a driving side of the transmission, and a V-belt assembly 2 is applied between the V-pulley 1 and a variable type V-pulley (not illustrated) on a driven side, for effecting power transmission therebetween.

The V-belt assembly 2 has an endless metallic belt 3 which comprises plural hoop belt members in layers, and a large number of V-shaped belt, engaging metallic members 4. Each of the members 4 has inclined lateral side surfaces 4a, which are adapted to be in contact with a V-groove 1a of the pulley 1, and has a groove 5 which opens outwards (upwards in the drawings). The metallic belt 3 is mounted in the groove 5 in the lengthwise direction of the endless metallic belt 3, and a large number of intermediate members 6 are interposed between respective adjacent ones of the metallic members 4. The intermediate members 6 are positioned on the inside (on a lower side in the drawings) of the metallic belt 3 and are fastened or bound together from the outer periphery thereof with the metallic belt 3. The metallic members 4, are in contact with the inside the metallic belt 3, at their respective outwardly directing engaging surfaces 7, which are the bottom portions of the respective grooves 5.

Each of the metallic members 4, is provided, on both sides thereof in the lengthwise direction of the metallic belt 3, with receiving surfaces 8, for receiving corresponding intermediate members 6. At least one of the receiving surfaces 8 is formed into a shape which gives a wedge effect for applying a pressing force, in the lengthwise direction of the metallic belt 3, to the corresponding one of the intermediate members 6, by a reaction force acting on each of the metallic members 4, generated in response to the pushing thereof into the V-groove 1a of the V-pulley 1.

Figure 5:
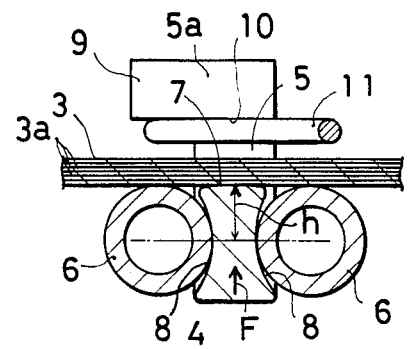
FIG. 5 is a sectional side view of an important portion thereof.

In order for the relative tiltable movements of the respective metallic members 4, about the intermediate member 6 therebetween to be smooth, it is preferable that at least one contact surface of each intermediate member 6, which is to be in contact with each of the receiving surfaces 8, have an arc shape. Additionally, it is desirable that the intermediate members 6, are partly or wholly made of hollow resilient metallic members so that any change in torque may be absorbed by the resilient property thereof, thereby preventing the generation of any gap caused by elongation of the belt. In the illustrated embodiment, each of the intermediate members 6, is made of a hollow slender roller type resilient metallic member. Additionally, the receiving surfaces 8, on both sides of each of the metallic members 4 are formed with an arc-shaped concave surfaces with the radius of each about 1.5–2 times the radius of each of the intermediate members 6, as shown clearly in FIG. 5. A wedge effect may thus be obtained by the curved surface of an inner part (lower part in the drawings) of each of the arc-shaped concave receiving surfaces 8.

Figure 6:
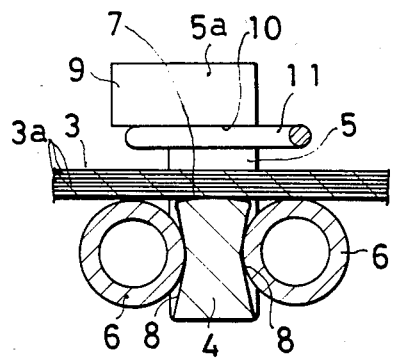
FIGS. 6–9 are sectional side views of important portions of other embodiments of the present invention.
Figure 7:
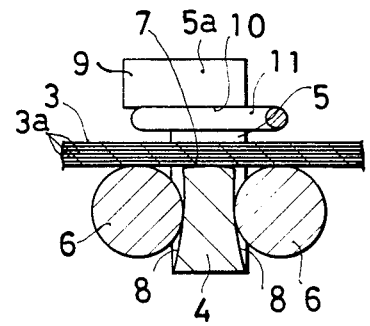
Figure 8:
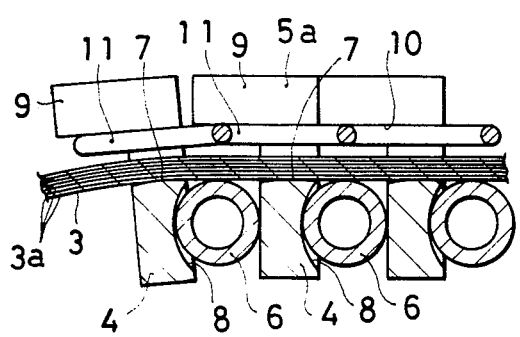

The present invention is not limited to the above described embodiment and modifications to the receiving surfaces 8 can be made such as a nearly V-shaped concave surface as shown in FIG. 6, or as shown in FIG. 7, an outer part thereof (upper part in the drawings) of each of the receiving surfaces 8, is an upright plane and only an inner portion thereof is formed into an inclined surface which produces the wedge effect. There can also be a modification such as shown in FIG. 8, where only the receiving surface 8 on one side is shaped to exhibit the foregoing wedge effect.

Figure 4:
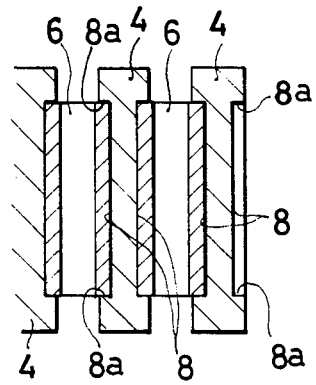

If each of the receiving surfaces 8 is formed into a recessed one having mutually opposite wall portions 8a, which are in contact with both end surfaces of each intermediate member 6, as shown in FIG. 4, it is advantageous in that the respective metallic members 4, be mutually regulated in position and contured in lateral directions so as to be smooth in their contact with the V-pulley 1. The outwardly directed engaging surface 7 is contoured such that the sectional from thereof taken along the lengthwise direction of the metallic belt 3 is a convex surface with a radius of curvature which is substantially equal to the radius R of a turning region of the innermost layer belt member 3a of the metallic belt 3 around the V-pulley 1 or a convex surface that has a small flat plane in the middle portion thereof.

Additionally, the height of the engaging surface 7 measured from the center position is equal to or larger than the radius of the intermediate member 6 so that the metallic belt 3 is always in pressure contact with the engaging surface 7.

In another aspect of the present invention, the engaging surface 7 is positioned at the same level as the center, in the height directions, of the inclined surface 4a which is in contact with the V-groove 1a of the V-pulley 1. Namely, the height of $a_1$ of the engaging surface 7 measured from the inner edge (the lower edge in the drawings) of the inclined lateral side surface 4a and the height $a_2$ of the outer edge (the upper edge in the drawings) of the inclined surface 4a measured from the engaging surface 7 are equal. In this arrangement, the turning radius R, around the V-pulley 1, of the innermost layer belt member 3a of the metallic belt 3, which is in contact with the engaging surface 7, and the radius of the turning region of the center of the inclined surface 4a are equal so that the travel speed of the belt member 3a and that of each of the metallic members 4, when the belt assembly is moved to its linear movement region, are equal. Consequently, there is no slipping between the two, whereby any wearing caused by slipping can be prevented and the life of the belt assembly can be prolonged.

In a further apsect of the present invention, each of the metallic members 4 is provided with a projection 9 formed integrally therewith which projects, for example, from each of the groove wall portions 5a, on both lateral sides of the groove 5 into a gap between adjacent ones of the metallic members 4.

In this arrangement, in the linear movement region of the belt assembly, the metallic members 4 are mutually regulated in position by the projections 9, and any unnecessary inclination thereof can be prevented. In the illustrated embodiment, the projection 9 projects into only one of the two gaps formed on the sides, in the lengthwise direction of the metallic belt 3, of each of the metallic members 4. The projection 9 may be also project into the respective gaps on both sides thereof.

The groove wall portions 5a are provided at inner surfaces thereof with engaging grooves 10 disposed laterally away from the outer surface of the metallic belt 3, and a stopper member 11 is positioned in the groove in engagement with the engaging grooves 10. The metallic members 4 are thus prevented from separating from the metallic belt 3. In this case, the stopper member 11 comprises a W-shaped wire clip, which is resilient both in the groove width direction and in the groove opening direction (upper and lower directions in the drawings) of the groove 5. With this arrangement, the stopper member 11 makes it easier to assemble and disassemble the belt assembly and any generation of chattering noise caused by a free gap thereof, after assembling, can be eliminated.

Additionally, the stopper member 11 is of a relatively large size and projects forwards and rearwards, in the lengthwise direction of the metallic belt 3, from the groove 5, so that even if any of the stopper members 11, for the metallic members 4, is placed out of position in the beginning of assembling thereof, the stopper members 1, are thereafter brought into contact with one another during assembly of the entire V-belt assembly or during a driving operation thereof. Thus internal error in position is automatically corrected and the metallic members 4, are mutually regulated in position by their respective projections 9.

Figure 10A:
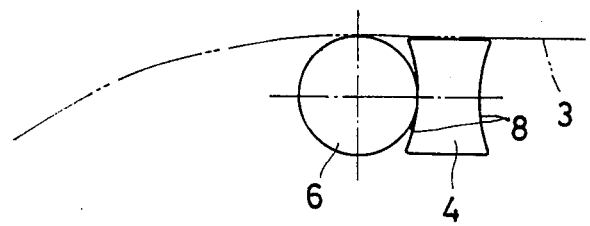
FIGS. 10(a), 10(b), and 10(c) are diagrams for explaining the operation of the present invention.
Figure 10B:
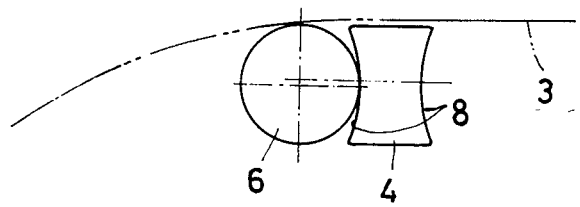
Figure 10C:
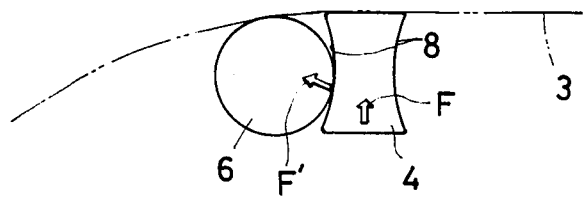

The operation of the apparatus of the present invention is as follows:

When the driving side V-pulley 1 is turned and thereby the V-shaped metallic member 4 is pushed into the V-groove 1a of the V-pulley 1 from a linear movement region of the V-belt assembly 2, the intermediate member 6, which is positioned in front of the metallic member 4, goes from the condition shown in FIG. 10(a) into the turning movement region of the V-belt assembly 2 as shown in FIG. 10(b). The intermediate member 6 moves inwards in the radial direction and thereby the metallic member 4 is pushed inwards by the intermediate member 6 as shown in FIG. 10 (b). Then when the metallic member 4 is pushed into the V-groove 1a and is applied with a reaction force F through its inclined lateral side surfaces 4a, the force acts to push the intermediate member 6, in the lengthwise direction of the metallic belt 3, by the wedge effect of the receiving surface 8, and the metallic member 4 is moved outwards while pushing the intermediate member 6 aside. The metallic member 8 is thus again brought into pressure contact, at the engaging surface 7 thereof, with the metallic belt 3 as shown in FIG. 10(c). During this operation, the intermediate member 6 is also brought into a strong pressure contact with the metallic belt 3 by a component of a pushing force F' acting thereon as result of the wedge effect of the metallic member 4. As a result, the reaction force F acts distributively on the metallic belt 3 not only through the metallic member 4 but also through the intermediate member 6, so that stress generated at each part of the metallic belt 3 can be decreased. There is thus no generation of a large stress generated when there is engagement only with the metallic member 4. In this manner, the metallic belt 3 can be turned integrally with the pulley 1 through the respective metallic members 4, and the respective intermediate member 6, and at the same time a tension force is applied to transmit power to the driven side V-pulley.

Figure 9:
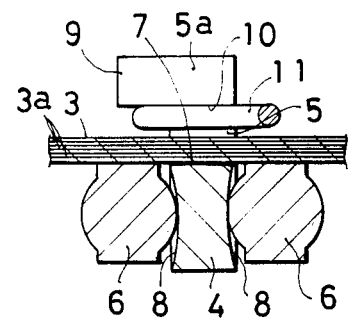

If each of the intermediate members 6, is shaped as shown in FIG. 9 and brought into surface contact with the metallic belt 3, the engaging force thereof can be advantageously increased.

Thus, according to the present invention, the reaction force generated when each metallic member is pushed into the V-pulley is applied to the metallic belt such that it is distrubuted to the metallic member and the intermediate member, so that the points at which the reaction forces act on the metallic belt can be increased in number, and the stress generated at each portion of the metallic belt becomes smaller, and thereby the metallic belt can be improved in its durability.

Further, the engaging surface of the metallic member is positioned at the same level as the center, in the height direction, of the inclined lateral side surfaces of the metallic member that are in contact with the V-groove of the V-pulley. Thus, the travel speed of the innermost layer belt member of the metallic belt, which is in pressure contact with the respective engaging surfaces, and the travel speed of the metallic members becomes equal. Consequently there is no slipping loss caused by a speed difference between the two, and thereby not only the life of the belt assembly but also the power transmission efficiency, is improved.

Still further, the respective metallic members are mounted, at their outwardly opening grooves, on the metallic belt and are prevented from separating from the metallic belt by stopper members which are resilient in both the groove width direction and in the groove opening upward and downward directions. The stopper members are mounted in the respective grooves so that assembling and disassembling of the V-belt assembly is facilitated and the stopper members are automatically set in position by being brought into contact with one another, even if those are not correctly set in position during the assembling of the V-belt assembly. The metallic members are arranged to be mutually regulated in position by projections formed thereon, so that the metallic members are prevented from being unnecessarily inclined and the assembling property and the working property of the V-belt assembly is improved.

The present invention may be embodied in other specific forms without departing from the spirit or essential charcteristics thereof. The presently disclosed embodiments are, therefore, to be considred in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A V-belt transmission comprising V-groove pulleys, an endless belt; a plurality of V-shaped belt engaging means positioned along said endless belt in the longitudinal direction thereof, each having a belt engaging surface for engaging said endless belt; a plurality of intermediate means positioned between adjacent engaging means, said intermediate means being positioned on the inside of said endless belt; wherein each of said engaging means includes receiving surface means for contacting said adjacent intermediate means, at least one of said receiving surfaces means being shaped to apply a force to said intermediate means in the longitudinal direction of said belt when said engaging means are brought into contact with the V-grooves of said V-groove pulleys.

2. A V-belt transmission as set forth in claim 1, wherein each of said intermediate means includes a contact surface means for contacting said receiving surface means, said contacting surface means having at least a portion which is arc shaped.

3. A V-belt transmission apparatus as set forth in claim 2 wherein at least a portion of said receiving surface means is arc shaped.

4. A V-belt transmission as set forth in claim 1 wherein said intermediate means has at least a portion thereof formed of a hollow metallic member.

5. A V-belt transmission as set forth in claim 1 wherein said belt engaging surface of said engaging means is aligned with the mid-point of the height of an inclined side surface of said engaging means, said inclined side surface contacting the V-groove of said V-groove pulleys.

6. A V-belt transmission as set forth in claim 1 wherein said engaging means includes a groove therein, the bottom of said groove forming said belt engaging surface, and a notch formed in each side wall of said groove, said notches being positioned above the top surface of said endless belt, said transmission further including a plurality of stopper means each extending across said groove and having end portions thereof engaged in said notches.

7. A V-belt transmission as set forth in claim 6 wherein said stopper means are resilient in both the vertical and transverse direction of said endless belt.

8. A V-belt apparatus as set forth in claim 6 wherein each of said stopper means contacts an adjacent stopper means, thereby maintaining the proper position of each of said stopper means.

* * * * *